(No Model.)
R. M. HIGGINS.
DEVICE FOR MOISTENING AND APPLYING POSTAGE STAMPS.
No. 547,666. Patented Oct. 8, 1895.
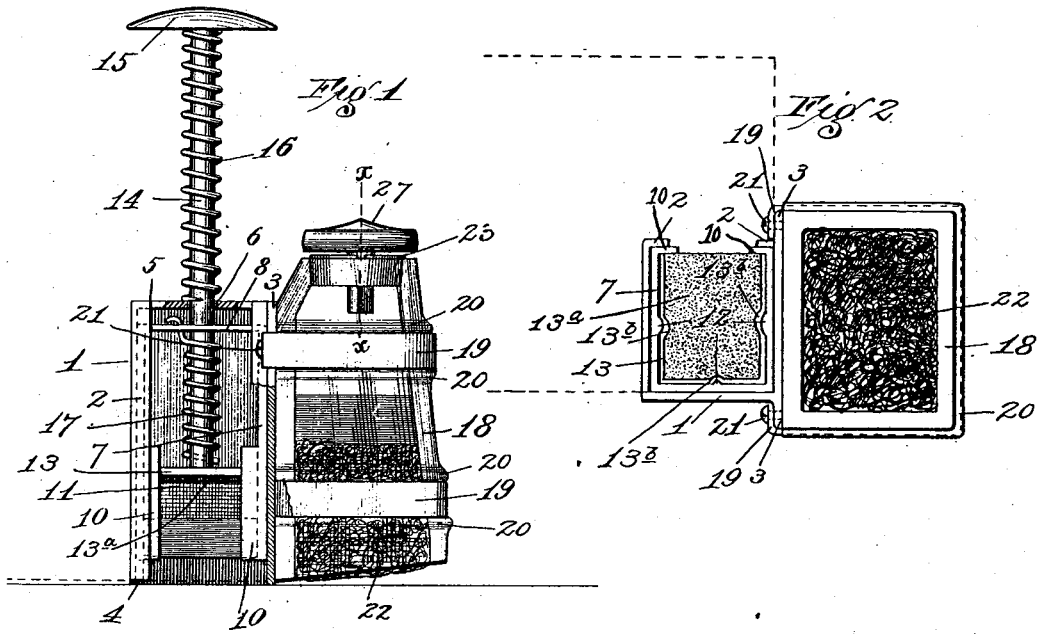
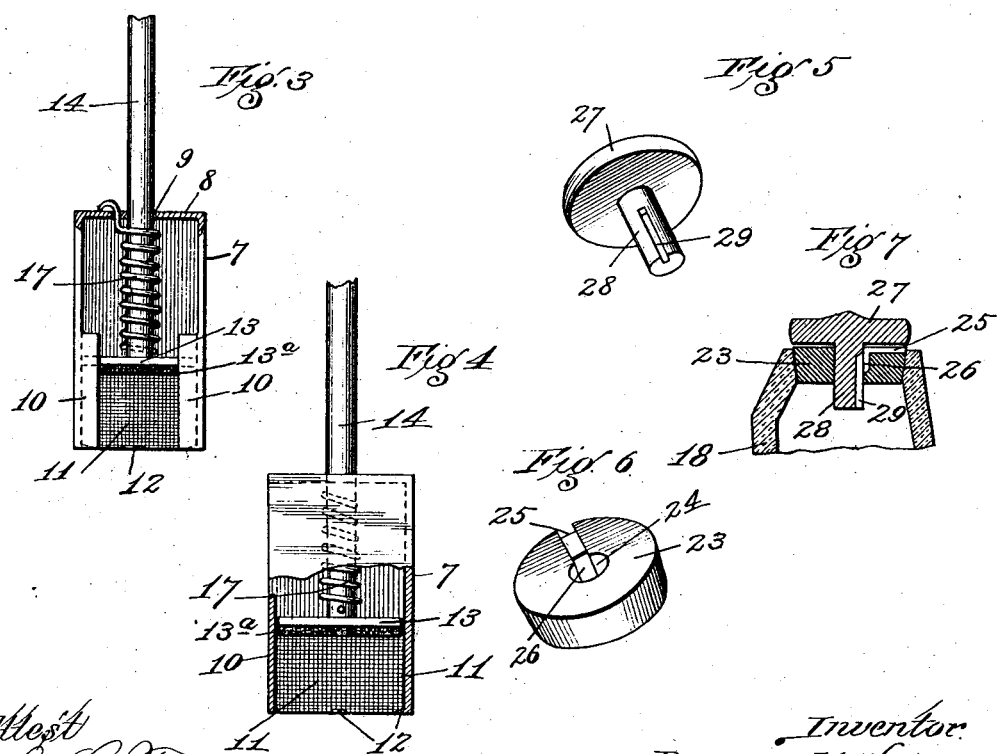
Attest
John L. Tinison
M. P. Smith
Inventor
Richard M. Higgins
By Higdon & Higdon & Longan
Attys

UNITED STATES PATENT OFFICE.

RICHARD M. HIGGINS, OF WEBSTER GROVES, MISSOURI.

DEVICE FOR MOISTENING AND APPLYING POSTAGE-STAMPS.

SPECIFICATION forming part of Letters Patent No. 547,666, dated October 8, 1895.

Application filed February 25, 1895. Serial No. 539,644. (No model.)

*To all whom it may concern:*

Be it known that I, RICHARD M. HIGGINS, of the city of Webster Groves, St. Louis county, State of Missouri, have invented certain new and useful Improvements in Devices for Moistening and Applying Postage-Stamps, of which the following is a full, clear, and exact description, reference being had to the accompanying drawings, forming a part hereof.

My invention relates to a device for moistening and applying postage-stamps; and it consists in the novel construction, combination, and arrangement of parts hereinafter described and claimed.

In the drawings, Figure 1 is a front elevation of my improved device, parts thereof being broken away to more clearly illustrate the same. Fig. 2 is a plan view of the under side of my improved device. Fig. 3 is a front elevation of the vertically-moving stamp-receptacle. Fig. 4 is a side elevation of the stamp-receptacle, a portion thereof being broken away to more clearly illustrate the same. Fig. 5 is a view in perspective of one portion of a cork of which I make use in carrying out my invention. Fig. 6 is a view in perspective of the mating portion of the cork of which I make use in carrying out my invention. Fig. 7 is a cross-sectional view taken approximately on the indicated line $x\ x$ of Fig. 1.

Referring by numerals to the accompanying drawings, 1 indicates a three-sided casing that is provided on its front side with vertical flanges 2. On one side of said casing are formed integral laterally-projecting flanges 3. The lower ends of the vertically-arranged flanges 2 and one of the side walls of the casing 1 are cut away, as indicated by the numeral 4, thereby making them slightly shorter than are the remaining sides of the casing. The casing is provided with an integral top plate 5, in which is formed a centrally-arranged aperture 6.

Mounted to slide vertically within the casing 1 is a three-sided casing 7, provided with a closed top 8, in which is formed an aperture 9, said aperture 9 being in direct alignment with the aperture 6 in the top plate 5 of the outer casing 1. On the lower half of the front edges of the side walls of this casing 7 are formed integral vertical flanges 10, that engage against and ride immediately in the rear of the vertically-arranged flanges 2 of the casing 1. The inner surfaces of the walls of the casing 7, that lie in the same plane with these vertically-arranged flanges 10, are corrugated or roughened similar to the face of a file, said corrugated surfaces being indicated by the numeral 11. Formed integral and extending laterally in the same plane with the lower edges of the rear and side walls of the casing 7 are projecting lips 12, the same being very thin and projecting but a slight distance from the inner surfaces of said walls. This casing 7 may be properly termed the "stamp-receptacle," as the stamps are held in the lower portion thereof until they are applied to the mail-matter.

13 indicates a rectangular metallic plate that fits snugly and operates within the stamp-receptacle 7.

$13^a$ indicates a plate of rubber or analogous material that is located and fastened to the under side of the plate, and on three sides thereof is provided with semicircular notches or cut-away portions $13^b$, that allow said flexible plate to pass the lips 12 on the lower edge of the stamp-receptacle.

Fixed to the plate 13 and extending vertically upward through the apertures 9 and 6 in the tops 8 and 5 of the rectangular casings is a plunger-rod 14, upon the end of which is a circular disk 15, which performs the function of a handle. Located upon this plunger-rod 14 and interposed between the handle 15 and the top plate 5 of the casing 1 is an expansive coil-spring 16. Located upon the plunger-rod 14 between the top plate 8 of the stamp-receptacle 7 and the plate 13 is a coil-spring 17, the lower end of which is passed through and rigidly held in the lower end of said plunger-rod 14. The upper end of this coil-spring 17 is passed through and rigidly fixed in the top plate 8 of the stamp-receptacle 7.

18 indicates a suitable glass bottle or receptacle, the same being open at both ends and rigidly held to the casing 1 by means of metallic bands 19, passing around the upper and lower end of said bottle 18 and between integral flanges 20 formed thereon, said bands being fixed to the laterally-projecting flanges 3 of the casing 1 by screws 21 or in any suitable manner. In the lower end of the bottle 18 is located a sponge 22 or an analogous body of material. Located in the upper end of the bottle 18 is a cork 23, of rubber or analogous material, the same being provided with the centrally-arranged vertical aperture 24. Formed in the top face of the cork 23 and extending from the outer edge thereof to this vertically-arranged aperture 24 is a groove or depression 25, and formed in the inner face of the centrally-arranged aperture 24 and extending from the end of this groove or depression 25 to a point slightly above the lower face of the cork 23 is a groove or depression 26.

27 indicates a cork-head, from the under side of which depends a stopper 28, that fits snugly within the vertically-arranged aperture 24. Formed in the surface of this stopper 28 and extending vertically therein from the bottom to the cork-head is a groove or depression 29, that is appropriately of the same size in cross-section as are the grooves or depressions 25 and 26.

The device so constructed is prepared for practical use by locating sufficient water in the bottle 18 to thoroughly saturate the sponge and partially fill the remaining space in said bottle, and by locating within the stamp-receptacle 7, below the plate 13, a body of stamps, the same being laid upon each other with the adhesive side downward. The minute projections 12 on the lower edges of the walls of the stamp-receptacle retain this body of stamps and prevent the same from dropping out of the receptacle, and the corrugated inner faces of said receptacle also assist in retaining the body of stamps within the receptacle.

The operation is as follows: The lower end of the sponge 22, that projects from the lower end of the bottle 18, is passed over that portion of the mail-matter on which the stamp is to be placed, and said sponge being in a moist condition the surface of the mail-matter will necessarily be moistened. Immediately after the surface has been thus moistened the portion of the device containing the stamps is located directly over said moistened portion, and if the mailable matter be a letter the device can be properly placed upon the corner of said letter, as the lower ends of the vertical flanges 2 and one of the sides of the outer casing 1 are cut away to allow for the thickness of the letter. When the device has thus been positioned, the operator bears down upon the handle 15, and in so doing the plunger-rod 14 and plate 13 at the lower end thereof will necessarily be moved downwardly. With this movement the coil-spring 16 will be compressed, and the stamp-receptacle 7 being connected to the plunger-rod 14 by means of the coil-spring 17, said coil-spring and casing 7 will also be moved downwardly. As soon as the lower end of the stamp-receptacle 7 contacts with the surface of the mail-matter it will necessarily stop; but the plunger-rod 14 and handle 15 will be moved on downwardly until the plate 13 engages against the top of the body of stamps. In so doing the coil-spring 16 is further compressed and the coil-spring 17 is extended. The pressure of the plate 13 upon the body of stamps will cause the lower end of said stamps to engage directly upon the moistened surface of the mail-matter, and necessarily a stamp will adhere to said mail-matter. The pressure is now removed from the handle 15, and the plate 13, plunger-rod 14, coil-springs 16 and 17, and the stamp-receptacle 7 return to their upward limit of movement and consequently to their normal positions. As the stamp-receptacle 7 moves upwardly, the edges of the stamp that are adhering to the mail-matter will pass by the minute projections or lips 12 on the lower edges of said stamp-receptacle, and the stamp or stamps next to the one that has just been placed upon the mail-matter will be prevented from accidentally withdrawing from said stamp-receptacle. By locating the flexible plate 13ª on the under side of the plate 13 the last few stamps within the stamp-receptacle may be discharged therefrom in the usual manner without the plate 13 coming in contact with the minute lips or projections 12. Should the water within the bottle 18 not feed down to the end of the sponge 22 as rapidly as desired, the operator turns the cork-head 27, having the stopper 28 formed integral therewith, to such a position as that the depression or groove 29 therein registers with the groove or depression 26 in the flexible cork 23. This allows air to pass to the interior of the bottle 18, and consequently the supply of water will be increased in volume to the lower end of the moistening-sponge. The cork-head 27 may be at any time turned in either direction, so that the groove or depression 29 in the stopper 28 does not register with the groove or depression in the flexible cork 23, and the air-supply to the interior of the bottle thereby cut off.

A device of this construction is extremely simple, easily manipulated, and much time, labor, and annoyance is saved in stamping large numbers of letters and other mailable matter at a time.

What I claim is—

1. In a device of the class described, a three-sided casing, flanges formed integral with the forward edges of the sides of said casing, the lower ends of said flanges and one side being cut away, a stamp-receptacle mounted for vertical movement within said casing, a plunger-rod passing vertically through the stamp-receptacle and the outer casing, a handle located upon the upper end of said plunger-rod, a plate fixed to the lower end of said plunger-rod and operating within the stamp-receptacle, the inner and lower faces of said stamp-receptacle being corrugated or roughened, and lips or projections formed integral and extending laterally from the lower edges of the stamp-receptacle.

2. In a device of the class described, a casing, a stamp-receptacle mounted for vertical movement within said casing and having its inner lower face corrugated or roughened, lips or projections formed integral with the lower edges of said receptacle and extending laterally therefrom, a plunger-rod passing vertically through the upper ends of the stamp-receptacle and the casing, a handle fixed to the upper end of said plunger-rod, a coil-spring interposed between said handle and the upper end of the casing, a metallic plate fixed to the lower end of said plunger-rod, a flexible plate fixed to the under side of said metallic plate, and a coil-spring mounted upon the lower end of the plunger-rod, one end of which is fixed to the lower end of said rod, the upper end of said coil-spring being fixed to the upper end of the stamp-receptacle.

In testimony whereof I affix my signature in presence of two witnesses.

RICHARD M. HIGGINS.

Witnesses:
ED. E. LONGAN,
JOHN C. HIGDON.